(12) United States Patent
Konno et al.

(10) Patent No.: US 7,074,145 B2
(45) Date of Patent: Jul. 11, 2006

(54) SLIDING CONTACT GUIDE FOR TRANSMISSION DEVICE

(75) Inventors: Masahiko Konno, Osaka (JP); Kozo Inoue, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 143 days.

(21) Appl. No.: 10/346,040

(22) Filed: Jan. 16, 2003

(65) Prior Publication Data

US 2003/0139238 A1 Jul. 24, 2003

(30) Foreign Application Priority Data

Jan. 22, 2002 (JP) .............................. 2002-013252

(51) Int. Cl.
*F16H 7/08* (2006.01)
*F16H 7/18* (2006.01)
(52) U.S. Cl. ....................................... 474/111; 474/140
(58) Field of Classification Search ................ 474/140, 474/111, 101, 148, 123, 109, 145
See application file for complete search history.

(56) References Cited

U.S. PATENT DOCUMENTS

| | | | | |
|---|---|---|---|---|
| 4,826,468 A | * | 5/1989 | Friedrichs | 474/101 |
| 4,832,664 A | * | 5/1989 | Groger et al. | 474/111 |
| 5,033,593 A | * | 7/1991 | Kazuhito | 188/377 |
| 5,318,482 A | * | 6/1994 | Sato et al. | 474/111 |
| 5,853,341 A | * | 12/1998 | Wigsten | 474/140 |
| 6,645,102 B1 | * | 11/2003 | Kumakura | 474/111 |

FOREIGN PATENT DOCUMENTS

| | | | |
|---|---|---|---|
| GB | 2 371 613 A | | 7/2002 |
| JP | 10179208 A | * | 7/1998 |
| JP | 3253951 B1 | | 11/2001 |

OTHER PUBLICATIONS

Merriam-Webster OnLine Dictionary.*

* cited by examiner

*Primary Examiner*—Marcus Charles
(74) *Attorney, Agent, or Firm*—Howson and Howson

(57) ABSTRACT

In a sliding contact guide for a flexible power transmission medium such as a chain or belt, the guide body includes a shoe and a plate-receiving portion integrally molded as a unit from a synthetic resin. A reinforcing plate is inserted into a slot in the plate-receiving portion. A surface of the reinforcing plate is of a concavo-convex shape. The concavo-convex shape enhances the strength of the reinforcing plate without increasing the overall weight of the guide. By controlling the spacing of the bend lines forming the concavo-convex configuration, the strength of the guide can be controlled in accordance with strength requirements for different regions of the guide.

9 Claims, 8 Drawing Sheets

SLIDING CONTACT GUIDE FOR TRANSMISSION DEVICE

FIELD OF THE INVENTION

This invention relates to a sliding contact guide for a power transmission utilizing an endless, circulating, flexible power transmission medium. It relates, for example, to a guide in a chain drive transmission, in which a chain transmits power from a driving sprocket to a driven sprocket, or to a guide in a belt drive transmission, in which a belt transmits power from a driving pulley to a driven pulley.

BACKGROUND OF THE INVENTION

In general, as shown in FIG. 9, a chain or belt transmission device for valve timing in an internal combustion engine, or for transmitting rotational power in another drive mechanism, includes a chain or belt CH, which transmits power from a driving sprocket or pulley S1 to one or more driven sprockets or pulleys S2. The transmission includes a pivotally mounted, movable sliding contact guide Ga, which cooperates with a tensioner, and a fixed sliding contact guide Gb. The movable guide and the fixed guide are attached to a frame E of the engine or other drive mechanism by suitable pins P or by bolts, or similar mountings. The guides make sliding contact with the chain or belt CH, and prevent vibration of the chain or belt both in the plane of its traveling path (which is usually vertical), and in the transverse direction. The pivoting guide Ga cooperates with a tensioner T to maintain tension in the chain or belt.

FIG. 7, is an exploded side view of a movable guide (i.e., a tensioner lever) 30 for use with a chain, as disclosed in Japanese Patent No. 3253951. FIG. 8 is bottom plan view of the guide. The guide 30 comprises a guide body including a shoe 31 on a surface of which chain CH travels in sliding contact. A plate-receiving portion 32 is provided on a back of the shoe 31, and extends along the longitudinal direction of the guide. The plate-receiving portion and the shoe are integrally molded as a unit from a synthetic resin. A reinforcing plate 40, composed of a rigid material, is fitted into a slot 32a in an edge of the plate-receiving portion. This slot opens in a direction facing away from the shoe, and extends along the longitudinal direction of the guide. The plate-receiving portion 32 is provided with a mounting hole 32b adjacent one end thereof, for mounting the guide body on a frame of an engine, or other machine. A mounting hole 41 is provided adjacent one end of the reinforcing plate 32 at a position such that it comes into register with the mounting hole 32b when the reinforcing plate 40 is fitted into slot 32a. This allows the guide body and reinforcing plate to be fastened together on a pivot means such as a mounting bolt, a mounting pin or the like.

Since the shoe 31 and the plate-receiving portion 32 are integrally molded as a unit from a synthetic resin, it is not necessary to provide a separate shoe. Thus, the number of parts, and the number of production steps are reduced. Further, since the reinforcing plate 40 is received in slot 32a in the plate-receiving portion 32 the strength of the guide in its pivoting direction is increased, and its bending rigidity, toughness and strength are significantly improved. The use of this type of guide has increased rapidly due to the demand for low cost and high reliability.

However, in order to increase the strength of the guide, it is necessary to increase the thickness in the reinforcing plate. The increase in thickness results in an undesirable increase in the weight of the reinforcing plate and in the overall weight of the guide. Moreover, when reinforcing plates are formed by punching a rolled metallic sheet or by molding a fiber-reinforced resin, production difficulties are encountered when increased plate thickness is desired. Furthermore, some regions in the reinforcing plate require higher strength than others. For example the region surrounding the mounting hole, and the region adjacent the part that contacts the plunger of a tensioner, require higher strength than other regions. However, it was not easy to vary the strength of a conventional reinforcing plate to meet the requirements for added strength only in the regions where additional strength is needed. Accordingly, to meet these regional strength requirements, it was conventional practice to make the entire reinforcing plate thicker, and the result was an increase in the weight of the reinforcing plate and in the overall weight of the guide body.

Accordingly a general object of the invention is to solve one or more of the above-mentioned problems of conventional sliding contact guides. Another object of the invention is to provide a sliding contact guide having enhanced strength without increasing the weight guide. Still another object is to provide a simple way to control strength distribution in a guide, according to the strength requirements of respective regions of the guide body.

BRIEF SUMMARY OF THE INVENTION

The sliding contact guide in accordance with the invention comprises an elongated shoe composed of synthetic resin, an elongated plate-receiving portion, and a reinforcing plate. The shoe has front and back sides and a surface extending longitudinally on the front side for sliding contact with a flexible power transmission medium. The elongated plate-receiving portion, which is also composed of synthetic resin, is integrally molded as a unit with the shoe on the back side thereof. The plate-receiving portion extends longitudinally along the back side of the shoe and has a longitudinally extending slot. The slot has opposed walls disposed in perpendicular relation to the transmission medium-contacting surface. A body mounting hole extends through the plate-receiving portion adjacent one end of the guide and intersecting the slot. The reinforcing plate, for reinforcing the guide, fits in the slot and has opposite surfaces respectively in opposed relationship to the opposed walls of the slot, and a through hole in register with the body mounting hole. In accordance with the invention, at least one of the opposite surfaces of the reinforcing plate has a concavo-convex shape.

The concavo-convex shape can be formed by bends along lines extending parallel to the opposed walls of the slot and transverse to the direction of elongation of the shoe. Alternatively, the concavo-convex shape can be formed by at least one bend extending substantially parallel to the direction of elongation of the shoe. At regions requiring increased strength, the bend lines can be closer together than the bend lines in other regions.

The materials, which form a guide body in the invention, are not significantly limited. However, since the sliding contact surface of the guide body functions as a shoe, the materials of the guide body are preferably so-called engineering plastics such as polyamide resin and the like, having high durability and superior lubricating properties. Suitable materials include nylon 6, nylon 66, all aromatic nylons and the like. Furthermore, fiber reinforced plastics may be used alone, or in combination with other materials, depending on requirements such as bending strength and the like.

Provided that the materials of the reinforcing plates have sufficient bending rigidity and strength, they are also not limited significantly. However, the materials of the reinforcing plates are preferably iron-based metals such as cast iron, stainless steel and the like, non-ferrous metals containing aluminum, magnesium, titanium or the like as the main component, engineering plastics such as polyamide resin, fiber-reinforced plastics, and the like.

By virtue of the concavo-convex shape of the reinforcing plate, the plate has an improved load-supporting capability over that of a conventional reinforcing plate composed of the same material. The sliding contact guide exhibits a significantly higher strength compared to that of a flat reinforcing plate having the same thickness.

When the concavo-convex shape is formed by bend lines parallel to the opposed walls of the slot and transverse to the direction of elongation of the shoe, the guide has improved strength to withstand loads exerted in the direction perpendicular to its shoe, for example impact loads exerted by the plunger of a tensioner cooperating with the guide.

On the other hand, when the concavo-convex shape is formed by one or more bend line extending in the longitudinal direction of the reinforcing plate, higher strength is exerted in longitudinal directional, so that the guide is better able to withstand longitudinal loads, such as vibration due to the pivoting of the guide or the like.

The density of the concavo-convex portions of the reinforcing plate can be varied by selecting the spacing of the bend lines, and accordingly the strength of the plate can be selectively enhanced in regions where larger loads are applied, such as the portion engaged by a plunger of the tensioner, or the portion surrounding the mounting hole.

DETAILED DESCRIPTION OF THE PREFERRED EMBODIMENTS

Figure 1:
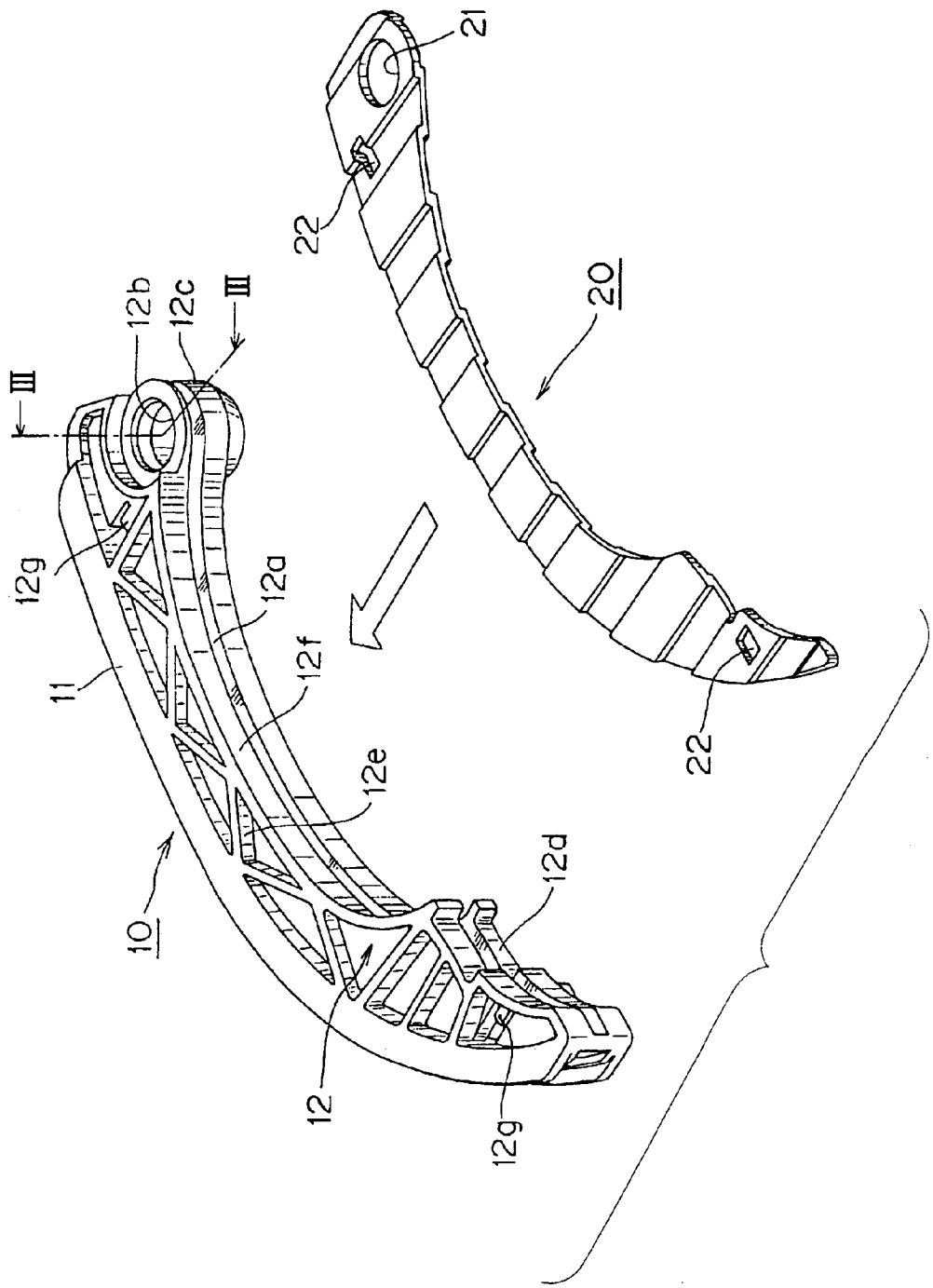
FIG. 1 is an exploded perspective view showing a movable guide according to a first embodiment of the invention.

In FIG. 1, a plastic movable guide 10 is formed by incorporating a reinforcing plate 20 into a guide body in the direction of the arrow.

This guide body is a plastic body integrally molded as a unit from synthetic resin, and comprises a shoe 11 having a surface on one side for sliding contact with a traveling chain, and a plate-receiving portion 12 provided on the back side of the shoe 11 and extending along the longitudinal direction of the guide. The guide body includes a flange 12f formed at an edge of the plate-receiving portion 12 remote from the shoe 11, and a boss 12c having a mounting hole 12b for pivotally mounting the guide body on the frame of an engine, or other machine incorporating a flexible transmission medium. The plate-receiving portion 12 has truss-shaped reinforcing ribs 12e, and a slot 12a opening at flange 12f, facing away from the shoe, and extending along the longitudinal direction of the guide.

To reinforce the guide body, a reinforcing plate 20, having a mounting hole 21, is fitted into the slot 12a. Holes 22 are locking holes for engagement with locking pieces 12g of the guide body when the reinforcing plate 20 is inserted into the guide body, in order to secure the reinforcing plate 20 to the guide body.

A plunger-receiving portion 12d is provided adjacent the pivoting front-end portion of the guide body for engagement with the plunger of a tensioner. The shape of the plunger-receiving portion 12d is not limited especially. For example, to prevent the plunger from becoming dislodged from the plunger-receiving portion 12d by transverse vibration, a protruding portion (not shown) is preferably formed at the edge of the flange 12a, for preventing transverse shift of the plunger.

Figure 3:
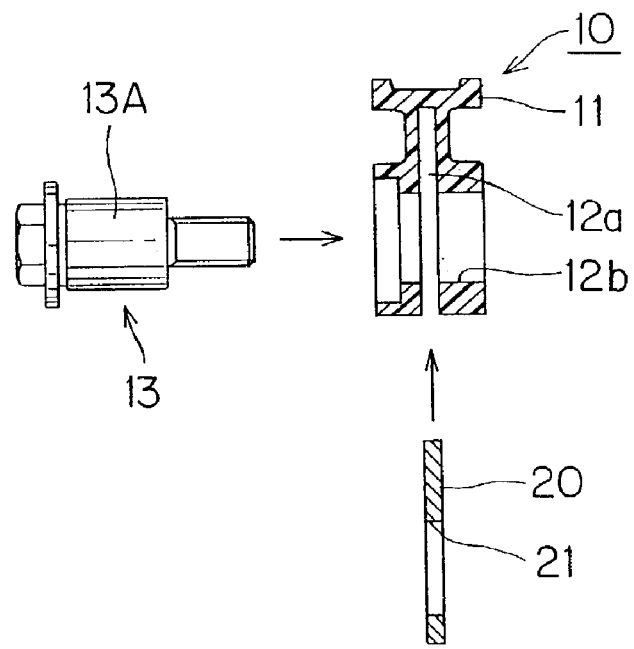
FIG. 3 is an exploded view of a cross-section of the movable guide taken on the plane —III—III— in FIG. 1, the exploded view also showing a mounting pin.

With the reinforcing plate 20 fitted into it, the movable guide is attached to the frame of an engine, or other machine, by a mounting pin or mounting bolt such as the shoulder bolt 13 shown in FIG. 3. The mounting bolt has a pivot portion 13A which is received in the holes 12b and 21 of the guide body and reinforcing plate, respectively. The mounting bolt not only establishes a pivot, but also assists holes 22 and locking pieces 12g in fastening the guide body 10 and the reinforcing plate 20 together.

Figure 2:
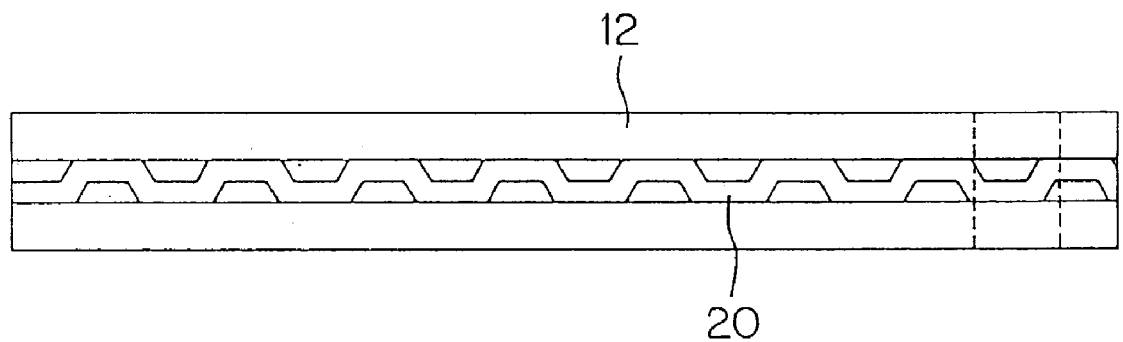
FIG. 2 is a bottom plan view of the movable guide shown in FIG. 1.

The reinforcing plate 20 is molded in a bent shape by pressing a metallic rolled sheet using a wave-shaped mold such that the bending lines of the plate are parallel to the walls of slot 12a, but transverse to the shoe, as shown in FIG. 1. The thickness of the material from which the reinforcing plate is formed is approximately one-half the width in the slot 12a. However, by virtue of the concavo-convex configuration of the reinforcing plate, it can fill the slot 12a as can be seen in FIG. 2. The reinforcing plate, bent as shown in FIGS. 1 and 2, can withstand large loads directed in the pivoting direction of the guide, and the guide exhibits a strength that is the same as or greater than that of a flat reinforcing plate having a thickness the same as the slot width.

Figure 4A:
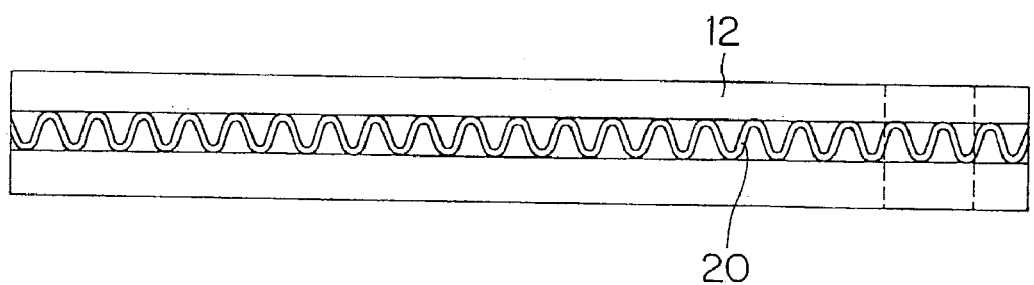
FIGS. 4(a), 4(b) and 4(c) are bottom plan views, corresponding to FIG. 2, of guides in accordance with further embodiments of the invention, showing alternative shapes for the reinforcing plate.
Figure 4B:
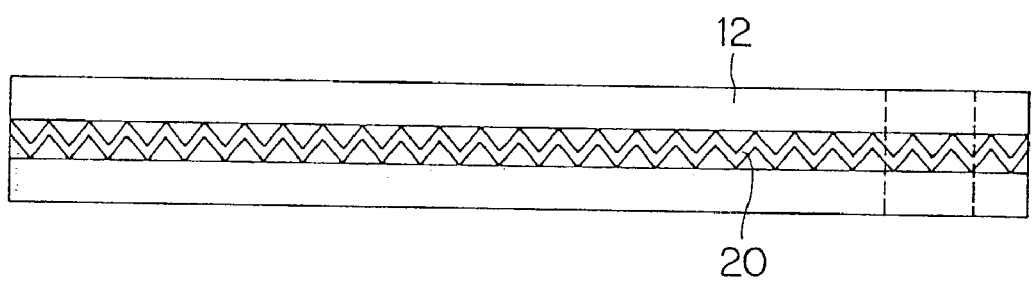
Figure 4C:
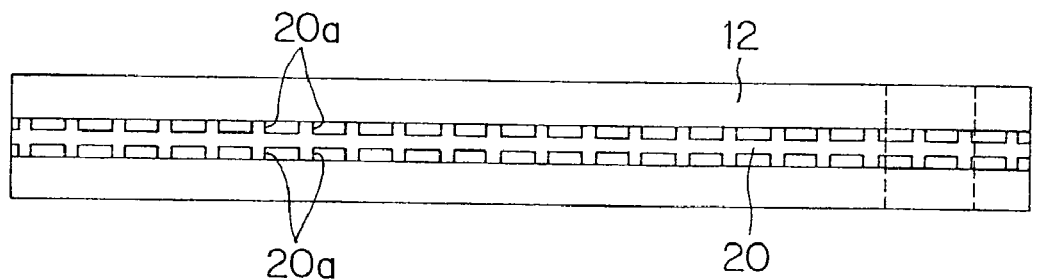

Although the reinforcing plate 20 was molded into a bent shape by pressing a rolled metallic sheet, the concavo-convex shape on the surface of the reinforcing plate can be also obtained by a die casting process, using a die casting mold having a concavo-convex shape. A fiber-reinforced resin can also be formed into the concavo-convex shape The concavo-convex shapes of the surface of the reinforcing plate are not limited to the shape shown in FIG. 2. Alternatively, a wave type shape such as shown in FIG. 4(a) can be adopted. Likewise, a bent shape, as shown in FIG. 4(b), having no longitudinally extending flat portions can be used. As a further alternative, a shape in which ribs 20a are formed on both surfaces of a reinforcing plate, as shown in FIG. 4(c), may be used. In the embodiments shown in FIGS. 2 and 4(a) to 4(c), a regular concavo-convex shape is formed, in which the bends are disposed at equal intervals. However, a more dense configuration of bend lines can be used to enhance the strength of the reinforcing plate. Thus, the concavo-convex shape in portions positioned at regions where a large load is applied, such as a region near the tensioner receiving portion 12d, and/or a region near the boss 12c, can be formed with a bend line density greater than that in other regions of the reinforcing plate formed than in other regions so that the strength of the guide can be selectively improved.

Figure 5:
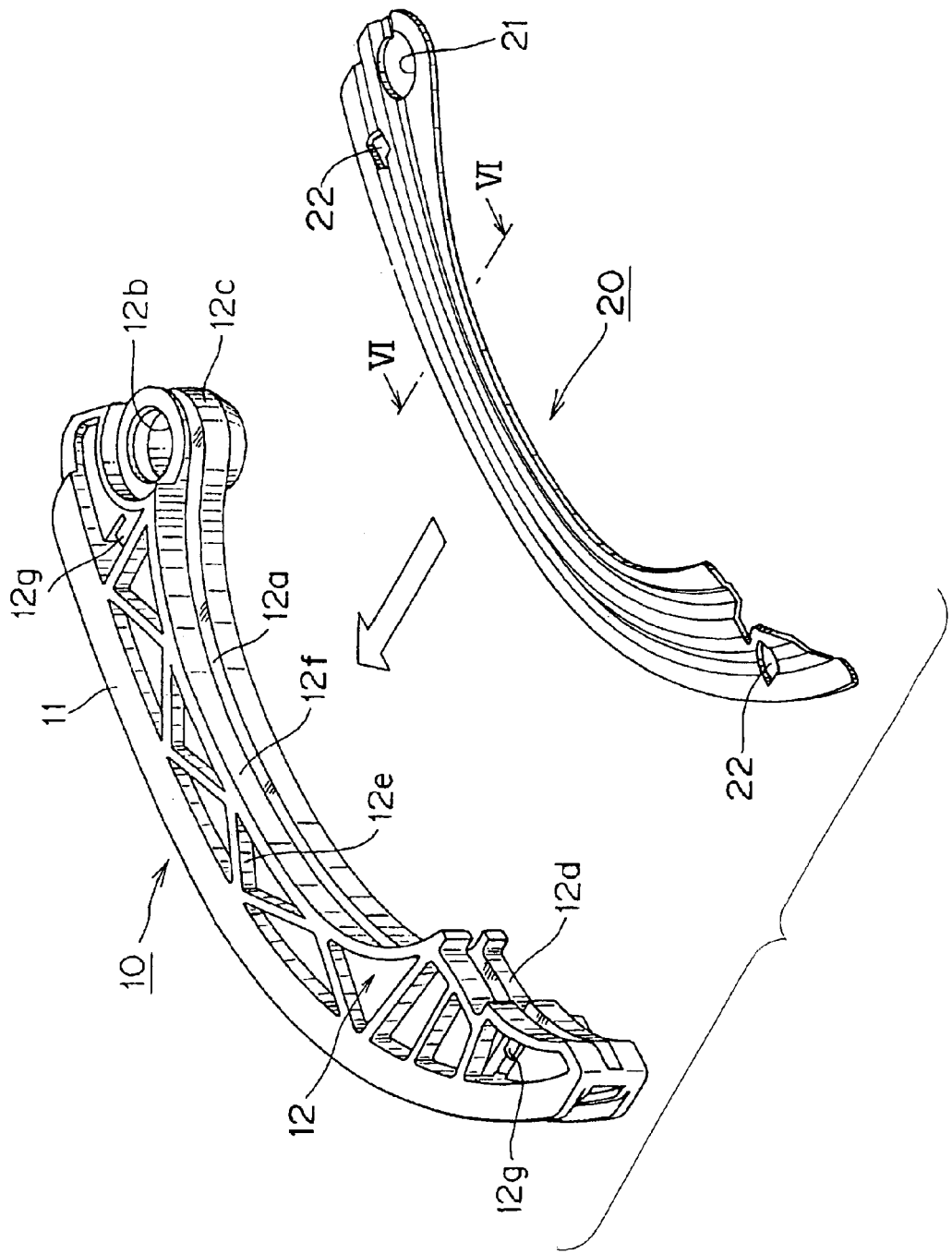
FIG. 5 is an exploded perspective view showing a mova0ble guide according to still another embodiment of the invention.
Figure 6:
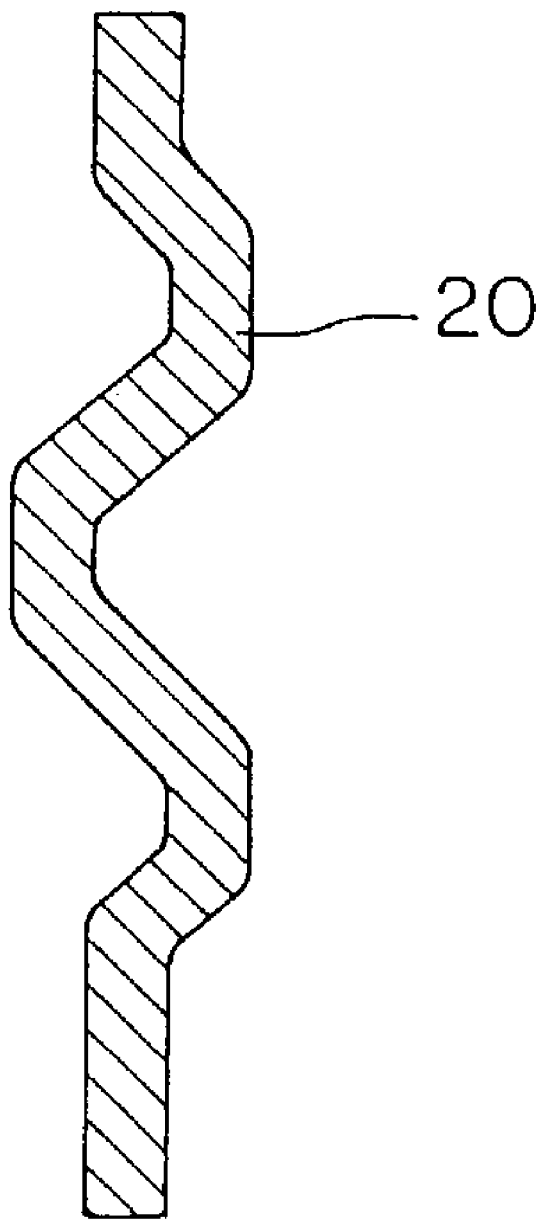
FIG. 6 is a cross sectional view taken on plane —VI—VI— in FIG. 5.
Figure 7:
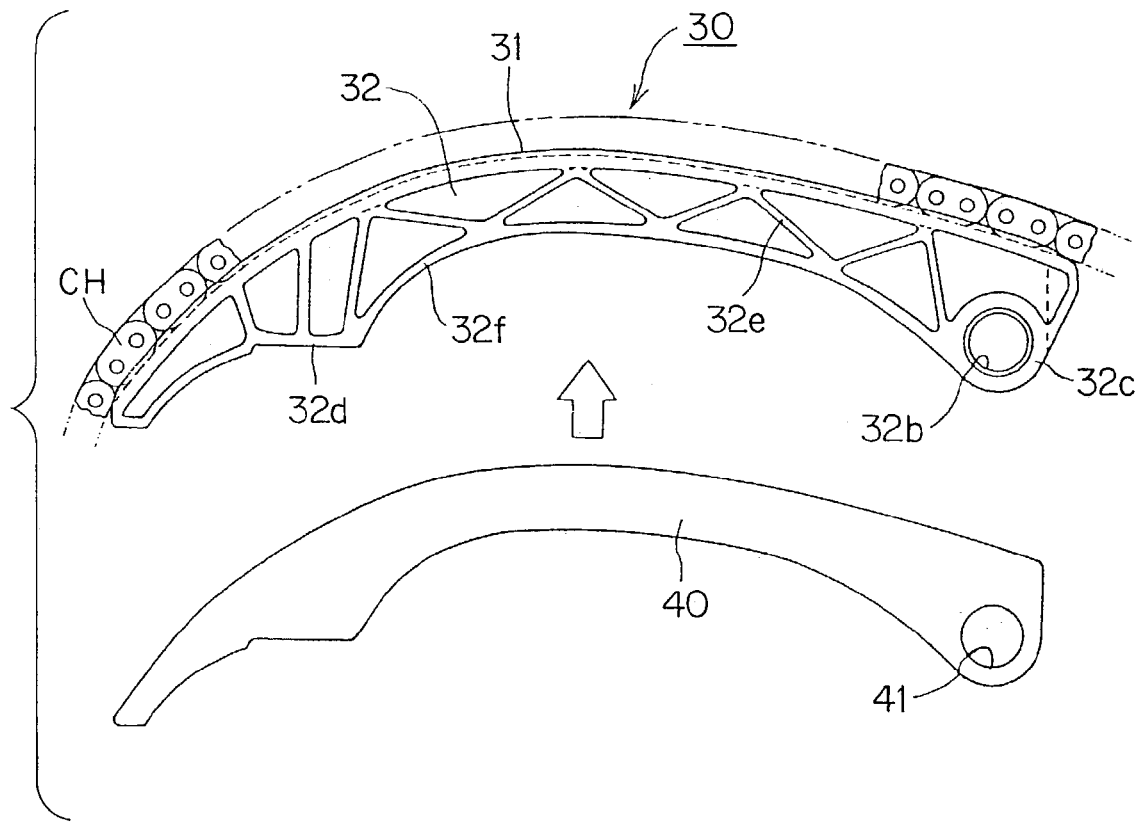
FIG. 7 is an exploded side view of a conventional movable guide
Figure 8:
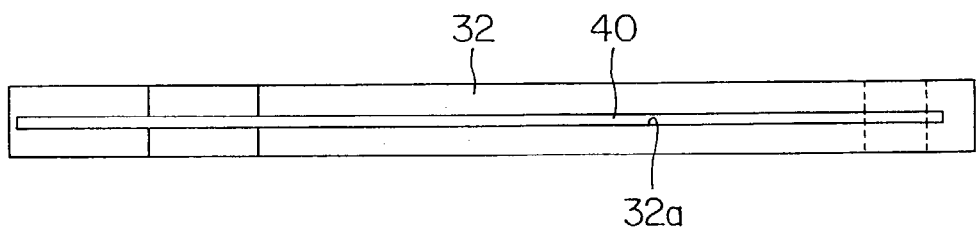
FIG. 8 is a bottom plan view of the conventional movable guide shown in FIG. 7.
Figure 9:
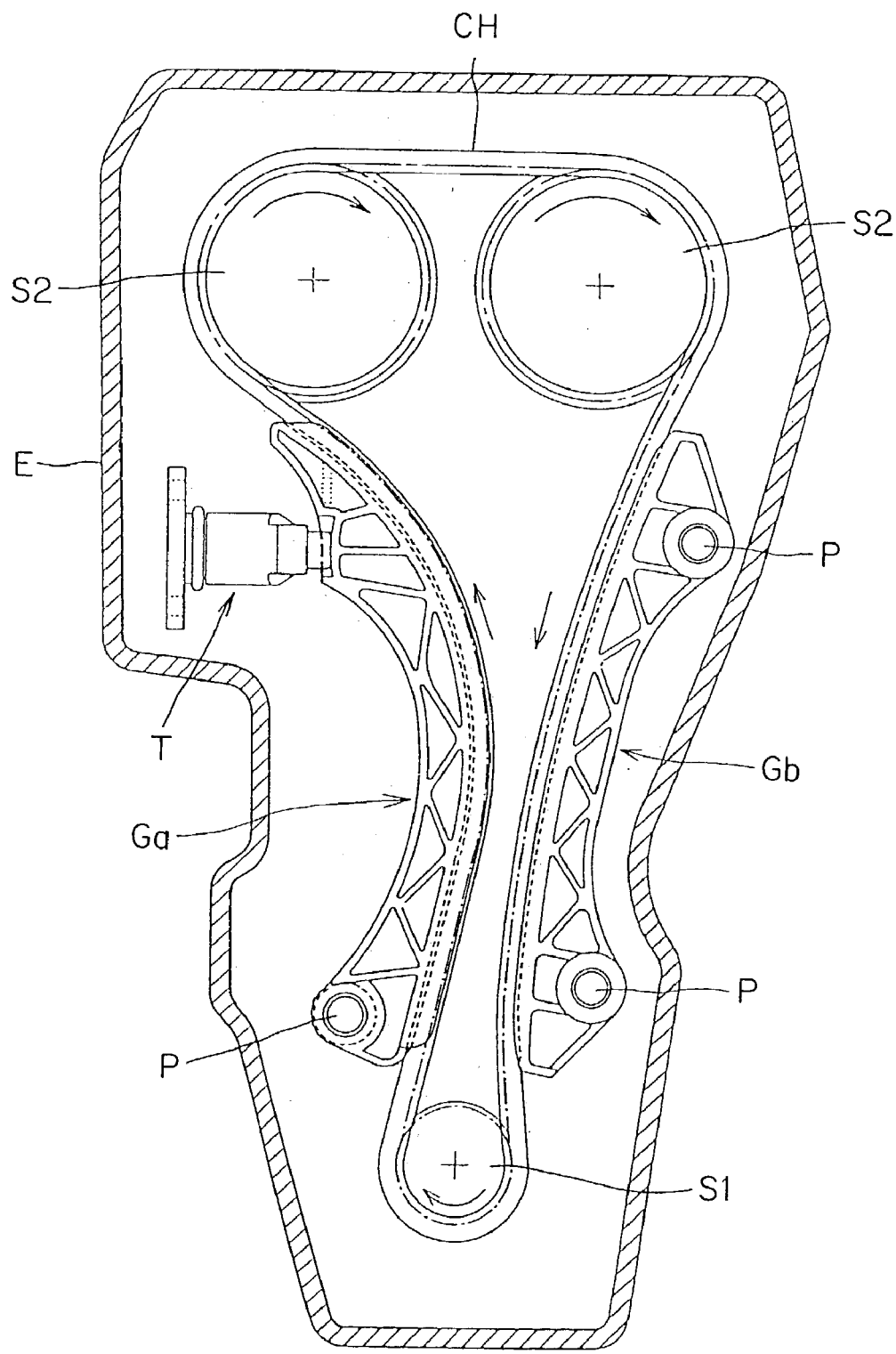
FIG. 9 is an elevational view showing sliding contact guides in the valve timing transmission of an internal combustion engine.

The embodiment shown in FIGS. 5 and 6, is substantially the same as the embodiments of FIGS. 1–4(c) except that the reinforcing plate 20 is formed so that the bending lines extend along the longitudinal direction of the reinforcing plate, and enhances the strength on the load in the longitudinal direction of the guide.

In the embodiments described so far, each of the guides is a movable guide, supported for pivotal movement on a mounting pin, bolt or the like. However, the invention can be applied to a fixed guide attached to a frame of an engine or the like by two mounting pins or bolts.

The most important advantages of the invention may be summarized as follows.

First, the concavo-convex shape of the reinforcing plate, provides the plate with an improved load-supporting capability. The sliding contact guide exhibits a significantly higher strength compared to that of a flat reinforcing plate having the same thickness. As a result the weight of the guide can be decreased, which contributes to improved fuel economy in the case of an engine.

When the concavo-convex shape is formed by bend lines parallel to the opposed walls of the slot and transverse to the direction of elongation of the shoe, the guide has improved strength to withstand loads exerted in the direction perpendicular to its shoe, for example impact loads exerted by the plunger of a tensioner cooperating with the guide.

On the other hand, when the concavo-convex shape is formed by one or more bend line extending in the longitudinal direction of the reinforcing plate, higher strength is exerted in longitudinal directional, so that the guide is better able to withstand longitudinal loads, such as vibration due to the pivoting of the guide or the like.

Figure 10:
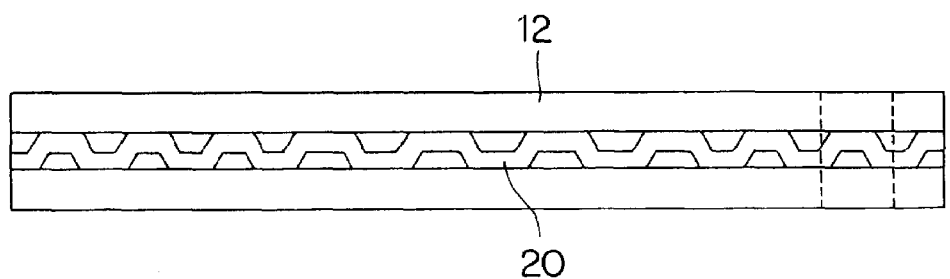
FIG. 10 is a bottom plan view corresponding to FIG. 2, showing bend lines near the ends of a reinforcing plate that are closer together than the bend lines in a central portion of the plate.

The density of the concavo-convex portions of the reinforcing plate can be varied by selecting the spacing of the bend lines, and accordingly the strength of the plate can be selectively enhanced in regions where larger loads are applied, such as the portion engaged by a plunger of the tensioner, and/or the portion surrounding the mounting hole. Thus, the bend lines can be formed close together at and near the ends of the reinforcing plate, and farther apart in the central portion of the plate as shown in FIG. 10.

The sliding contact guide according to the invention can be produced simply by changing the molds, dies or the like used to reproduce the reinforcing plate. Thus, production cost is not increased. Moreover the material cost is reduced. Therefore, the invention has significant industrial value.

We claim:

1. A sliding contact guide for a transmission device comprising an elongated shoe composed of synthetic resin, the shoe having front and back sides and a surface extending longitudinally on said front side for sliding contact with a portion of a flexible power transmission medium in contact with the shoe and extending along the direction of elongation of the shoe, and an elongated plate-receiving portion, also composed of synthetic resin, integrally molded as a unit with said shoe on said back side, the plate receiving portion extending longitudinally along the back side of the shoe and having a longitudinally extending slot, the slot having opposed walls disposed in perpendicular relation to said surface, a body mounting hole extending through the plate-receiving portion adjacent one end of the guide and intersecting said slot, a reinforcing plate, for reinforcing the guide, the plate fitting in said slot and having opposite surfaces respectively in opposed relationship to said opposed walls of the slot, and a through hole in register with said body mounting hole, wherein at least one of said opposite surfaces of the reinforcing plate is composed of plural regions which contact one of said opposed walls of the slot, said regions being separated from one another by recesses, each said recess having a bottom wall, facing, but spaced from, said one of said opposed walls of the slot.

2. A sliding contact guide for a transmission device according to claim 1, in which said regions and recesses of said at least one of said opposite surfaces of the reinforcing plate are formed by plural bend lines in each of at least two locations, the bend lines in one of said locations being closer together than the bend lines in another of said locations.

3. A sliding contact guide according to claim 1, in which said plural regions and said recesses of the reinforcing plate are formed by bends along lines extending parallel to said opposed walls of the slot and transverse to the direction of elongation of the shoe.

4. A sliding contact guide for a transmission device according to claim 3, in which said bend lines include a plural bend lines in each of at least two locations, the bend lines in one of said locations being closer together than the bend lines in another of said locations.

5. A sliding contact guide according to claim 1, in which said regions and recesses of said at least one of said opposite surfaces of the reinforcing plate are formed by bend lines extending substantially parallel to the direction of elongation of the shoe.

6. A sliding contact guide for a transmission device according to claim 5, in which said regions and recesses of said at least one of said opposite surfaces are formed by plural bend lines in each of at least two locations, the bend lines in one of said locations being closer together than the bend lines in another of said locations.

7. A sliding contact guide for a transmission device according to claim 1, in which each of said recesses has a bottom, and each said bottom has a first surface facing toward, and spaced from, said one of said opposed walls of the slot, and a second surface facing toward, and in contact with, the other one of said opposed walls of the slot.

8. A sliding contact guide for a transmission device according to claim 1, in which said plural regions and said recesses of the reinforcing plate are formed by bends in a sheet of material having a uniform thickness.

9. A sliding contact guide for a transmission device according to claim 1, in which each of said opposite surfaces of the reinforcing plate is composed of plural regions which contact one of said opposed walls of the slot, said regions being separated from one another by recesses, each said recess having a bottom wall, and in which at least a portion of the bottom wall of each recess on each side of the reinforcing plate forms a slot wall-contacting region on the opposite side of the reinforcing plate.

* * * * *